United States Patent
Knee

(10) Patent No.: US 8,587,679 B2
(45) Date of Patent: *Nov. 19, 2013

(54) VIDEO FRAMING CONTROL IN WHICH OPERATOR FRAMING OF NARROW VIEW IMAGE CONTROLS AUTOMATIC FRAMING OF WIDE VIEW IMAGE

(75) Inventor: Michael James Knee, Petersfield (GB)

(73) Assignee: Snell Limited, Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,559

(22) Filed: Nov. 9, 2011

(65) Prior Publication Data

US 2012/0050581 A1   Mar. 1, 2012

Related U.S. Application Data

(63) Continuation of application No. 12/194,856, filed on Aug. 20, 2008, now Pat. No. 8,102,432.

(30) Foreign Application Priority Data

Aug. 20, 2007 (GB) .................................. 0716257.1

(51) Int. Cl.
*H04N 5/232* (2006.01)
*H04N 7/18* (2006.01)

(52) U.S. Cl.
USPC .................. 348/211.3; 348/211.8; 348/211.9; 348/135; 348/142

(58) Field of Classification Search
USPC ........................... 348/135–142, 211.1–211.99
See application file for complete search history.

(56) References Cited

U.S. PATENT DOCUMENTS

| | | | |
|---|---|---|---|
| 5,164,827 A | 11/1992 | Palf | |
| 5,434,617 A | 7/1995 | Bianchi | |
| 5,729,471 A | 3/1998 | Jain et al. | |
| 5,912,700 A | 6/1999 | Honey et al. | |
| 6,154,250 A | 11/2000 | Honey et al. | |
| 6,215,519 B1 | 4/2001 | Nayar et al. | |
| 6,326,994 B1 | 12/2001 | Yoshimatsu | |
| 6,476,857 B1 * | 11/2002 | Agatsuma et al. | 348/152 |
| 6,704,048 B1 | 3/2004 | Malkin et al. | |
| 6,707,489 B1 | 3/2004 | Maeng et al. | |
| 6,734,911 B1 | 5/2004 | Lyons | |
| 6,738,073 B2 * | 5/2004 | Park et al. | 345/629 |
| 6,778,207 B1 | 8/2004 | Lee et al. | |
| 7,193,645 B1 | 3/2007 | Aagaard et al. | |
| 7,469,060 B2 * | 12/2008 | Bazakos et al. | 382/173 |
| 7,602,942 B2 * | 10/2009 | Bazakos et al. | 382/103 |
| 7,629,995 B2 | 12/2009 | Salivar et al. | |
| 7,929,611 B2 * | 4/2011 | Tsunekawa et al. | 375/240.16 |
| 7,952,608 B2 * | 5/2011 | Thompson | 348/143 |

(Continued)

FOREIGN PATENT DOCUMENTS

WO   WO 2006/040687   4/2006
WO   WO 2006/111734   10/2006

*Primary Examiner* — Lin Ye
*Assistant Examiner* — Chia-Wei A Chen
(74) *Attorney, Agent, or Firm* — Pearl Cohen Zedek Latzer, LLP

(57) ABSTRACT

In the creation of video program material, picture composition decisions—especially framing parameters—taken by an operator for small-display presentation of a scene are used the automatic generation of picture composition decisions for a larger display. Framing parameters such as pan, are temporally filtered before being applied to the wider field of view provided for the larger display.

12 Claims, 3 Drawing Sheets

(56) References Cited

U.S. PATENT DOCUMENTS

| | | | |
|---|---|---|---|
| 8,102,432 B2* | 1/2012 | Knee | 348/211.11 |
| 2002/0005902 A1 | 1/2002 | Yuen | |
| 2004/0179008 A1* | 9/2004 | Gordon et al. | 345/419 |
| 2004/0247193 A1* | 12/2004 | Qualtrough et al. | 382/243 |
| 2005/0018899 A1* | 1/2005 | Elyasaf et al. | 382/145 |
| 2005/0036036 A1 | 2/2005 | Stevenson et al. | |
| 2005/0058321 A1* | 3/2005 | Buehler | 382/103 |
| 2005/0071105 A1* | 3/2005 | Welles et al. | 702/85 |
| 2006/0049350 A1* | 3/2006 | Teich et al. | 250/330 |
| 2006/0050090 A1 | 3/2006 | Ahmed et al. | |
| 2006/0056056 A1 | 3/2006 | Ahiska et al. | |
| 2006/0083440 A1 | 4/2006 | Chen | |
| 2006/0088190 A1* | 4/2006 | Chinomi | 382/104 |
| 2006/0139475 A1* | 6/2006 | Esch et al. | 348/340 |
| 2006/0152512 A1* | 7/2006 | Gordon | 345/475 |
| 2006/0203087 A1 | 9/2006 | Kawanishi et al. | |
| 2006/0209186 A1 | 9/2006 | Iyoda et al. | |
| 2006/0274156 A1 | 12/2006 | Rabbani et al. | |
| 2007/0124783 A1 | 5/2007 | Ahiska et al. | |
| 2007/0235648 A1* | 10/2007 | Teich et al. | 250/330 |
| 2008/0024390 A1 | 1/2008 | Baker et al. | |
| 2008/0049123 A1 | 2/2008 | Gloudemans et al. | |

* cited by examiner

VIDEO FRAMING CONTROL IN WHICH OPERATOR FRAMING OF NARROW VIEW IMAGE CONTROLS AUTOMATIC FRAMING OF WIDE VIEW IMAGE

CROSS REFERENCE TO RELATED APPLICATION

This application is a continuation of U.S. patent application Ser. No. 12/194,856, filed Aug. 20, 2008 now U.S. Pat. No. 8,102,432, which claimed priority from Great Britain Patent Application No. GB 0716257.1, filed Aug. 20, 2007, both of which are hereby incorporated by reference.

FIELD OF INVENTION

This invention concerns the creation of video program material.

BACKGROUND OF THE INVENTION

Many different types of video display devices, having different display sizes, have been developed for different viewing situations. These range from large, often high-definition displays, suitable for dedicated viewing environments, to small, generally low-resolution displays intended for portable applications. It is recognised that the optimum approach to pictorial composition—angle of view, camera movement etc.—is different for these different display types. This can be generalised by saying that a small display requires a narrow view which tracks the action and a large display requires a wider view with minimal camera movement.

It is therefore helpful for video material to be made available in different versions, intended for different display sizes.

SUMMARY OF THE INVENTION

The present invention is directed to the use of known picture composition decisions for small-display presentation of a scene in the automatic generation of picture composition decisions for a larger display.

The invention consists, in one aspect, in a method and apparatus for creating a plurality of moving video image sequences depicting a scene having respective overlapping fields of view in which the framing of the image sequence having the narrowest field of view is controlled by an operator and one or more framing parameters for an image sequence having a wider field of view is derived automatically by processing data describing the framing of the said image sequence having the narrowest field of view.

Framing parameters describing any of pan, tilt or zoom can be derived.

Data describing the framing of the said image sequence having the narrowest field of view may be temporally filtered in order to derive framing parameters for a wider field of view.

In one embodiment, data describing the framing of the said image sequence having the narrowest field of view is re-scaled and/or limited in order to derive framing parameters for a wider field of view.

In an alternative embodiment, framing parameters for more than one video image sequence having a wider field of view are derived automatically.

There will be described a method of creating a plurality of moving video image sequences depicting a scene having respective overlapping fields of view, the plurality of image sequences comprising a first image sequence having a wider field of view and a higher resolution and a second image sequence having a narrower field of view and a lower resolution, in which the framing of the second image sequence is controlled by an operator and one or more framing parameters for the first image sequence are derived automatically by processing data describing the framing of the second image sequence. The framing parameter or parameters may be selected from the group consisting of a pan framing parameter; a tilt framing parameter; a zoom framing parameter and combinations thereof. Data describing the framing of the second image may be temporally filtered, re-scaled or limited in order to derive a framing parameter for the second image sequence. Combinations of these operations may be performed. Framing parameters for more than one video image sequence having a wider field of view may be derived automatically.

There will also be described apparatus for use with at least a first camera to create a plurality of moving video image sequences depicting a common scene, the plurality of image sequences comprising a first image sequence having a wider field of view and a higher resolution and a second image sequence having a narrower field of view and a lower resolution, such that an image of the first sequence contains more pixels than an image of the second sequence, the apparatus comprising an operator controlled framing controller for deriving a set of framing parameters defining at least in part a second field of view narrower than that of the second camera; and a framing processor for processing the framing parameters to provide the processed framing parameters for the wider frame of view provided by the first camera. This may be in the form of a camera controller for applying the processed framing parameters to the first camera or may be in the form of a video re-framing device for applying the processed framing parameters to the wider frame of view provided by the first camera.

The operator controlled framing controller may be associated with a second camera providing said second narrower field of view of the same scene. The operator controlled framing controller may be associated with a video re-framing device. The framing processor may be adapted to perform on the framing parameters an operation selected from the group consisting of temporally filtering, scaling, limiting, and combinations thereof.

The present invention also relates in another aspect to apparatus for creating a plurality of moving video image sequences comprising first and second cameras adapted to provide respective overlapping fields of view of a scene; the first camera having a wider field of view and a higher resolution than the second camera, the second camera being adapted to be controlled by an operator; a framing processor receiving framing parameters selected from the group consisting of pan parameters, tilt parameters, zoom parameters, track parameters and any combinations thereof, from said operator control and processing said parameters to derive processed framing parameters appropriate to the second camera; and a camera controller for applying processed framing parameters to the second camera. At least one of the framing parameters may be temporally filtered, re-scaled or limited in order to derive a framing parameter appropriate to the second camera.

BRIEF DESCRIPTION OF THE DRAWINGS

An example of the invention will now be described with reference to the drawings in which.

Figure 1:
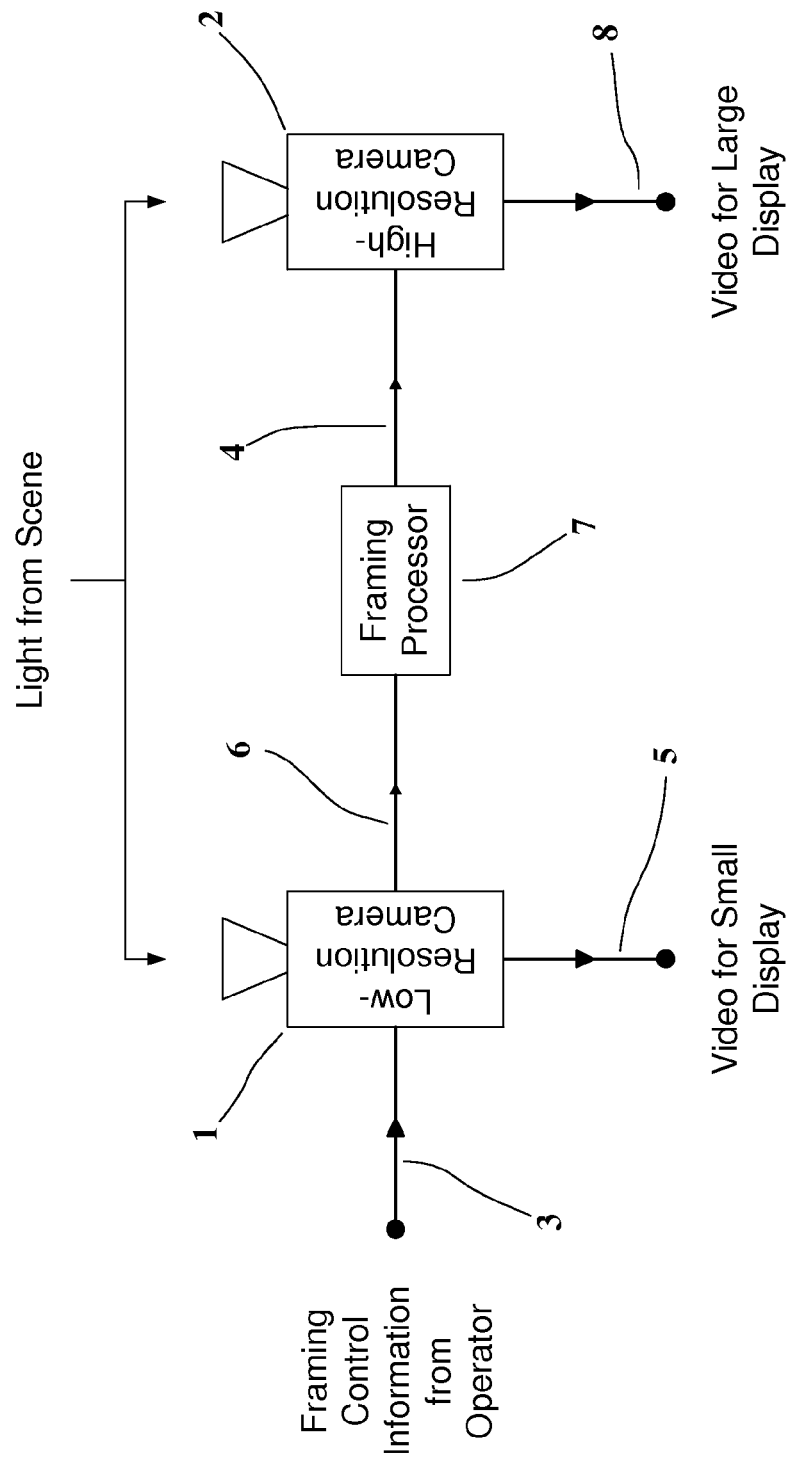
FIG. 1 shows an example of an image reframing system according to a first embodiment of the invention

Note that where elements in different Figures have analogous functions, the corresponding (one or two digit) reference numerals have the same units digit.

DETAILED DESCRIPTION OF THE INVENTION

An example of the invention is shown in FIG. 1 in which a first camera (1) and a second camera (2) both receive light from the same scene. In the following exemplary embodiment it is assumed that the first camera is a low resolution camera (1) and the second camera (2) is a high-resolution camera.

The two cameras are initially aligned so that the centres of their respective fields of view correspond to the same position in the scene. The high-resolution camera (2) has a wider field of view than the low-resolution camera (1) so that its field of view overlaps the field of view of the low-resolution camera (1). Also, the cameras are mounted sufficiently close together so that similar changes in framing applied to both cameras will have similar visual effect in the images acquired by the two cameras.

The two cameras are both able to alter their framing of the scene by panning, tilting, zooming, tracking etc. The low-resolution camera (1) receives framing control information (3) from a camera operator. This may be achieved by the operator directly moving the camera; or, by the operator entering control commands into a control system which indirectly controls the framing of the low-resolution camera (1); or by a combination of direct and indirect control. The high-resolution camera (2) receives framing control parameters (4) which enable its pan, tilt, zoom, tracking etc, to be adjusted; for example by suitable servomechanisms. Every framing parameter of the low-resolution camera (1) that the operator can control has an equivalent parameter for the high-resolution camera (2) that the framing parameters (4) can control.

In this exemplary embodiment the output (5) from the first, low-resolution camera (1) is intended for the small-screen display and the camera operator dynamically frames the scene so as to substantially fill the image with the most interesting part of the scene. The actual framing parameters of the camera (1) are captured by suitable sensors (such as shaft encoders etc.) to form framing data (6), which is passed to a framing processor (7).

The framing processor (7) converts the framing data (6) from the low-resolution camera (1) into the framing parameters (4), which control the framing of the high-resolution camera (2). In this embodiment the framing processor (7) achieves this by temporally low-pass filtering the framing data (6). This temporal filtering may be linear or non linear, for example a slew-rate limit could be applied; and, the filtering may be combined with scaling and/or limiting of the framing parameters. The intended result of these processes is that the high-resolution camera (2) follows the trend of the framing decisions made by the operator of the low-resolution camera, but ignores short-duration changes in framing. Scaling and limiting of the re-framing data can prevent extremities of the scene, never intended to be seen by viewers, from being included in the high-resolution image. It will usually be preferable to apply the re-scaling and range limitation prior to the temporal filtering.

The video output (8) from the high-resolution camera (2) is suitable for large-screen display where the viewer is able to track short duration changes in the location of the principal area of interest by eye-movement. Longer-term changes in the location of the principal area of interest will be reflected in the framing parameters (4) which will cause the framing of the high-resolution camera (2) to change so as to ensure that this location is within the field of view of the high-resolution camera (2).

Figure 2:
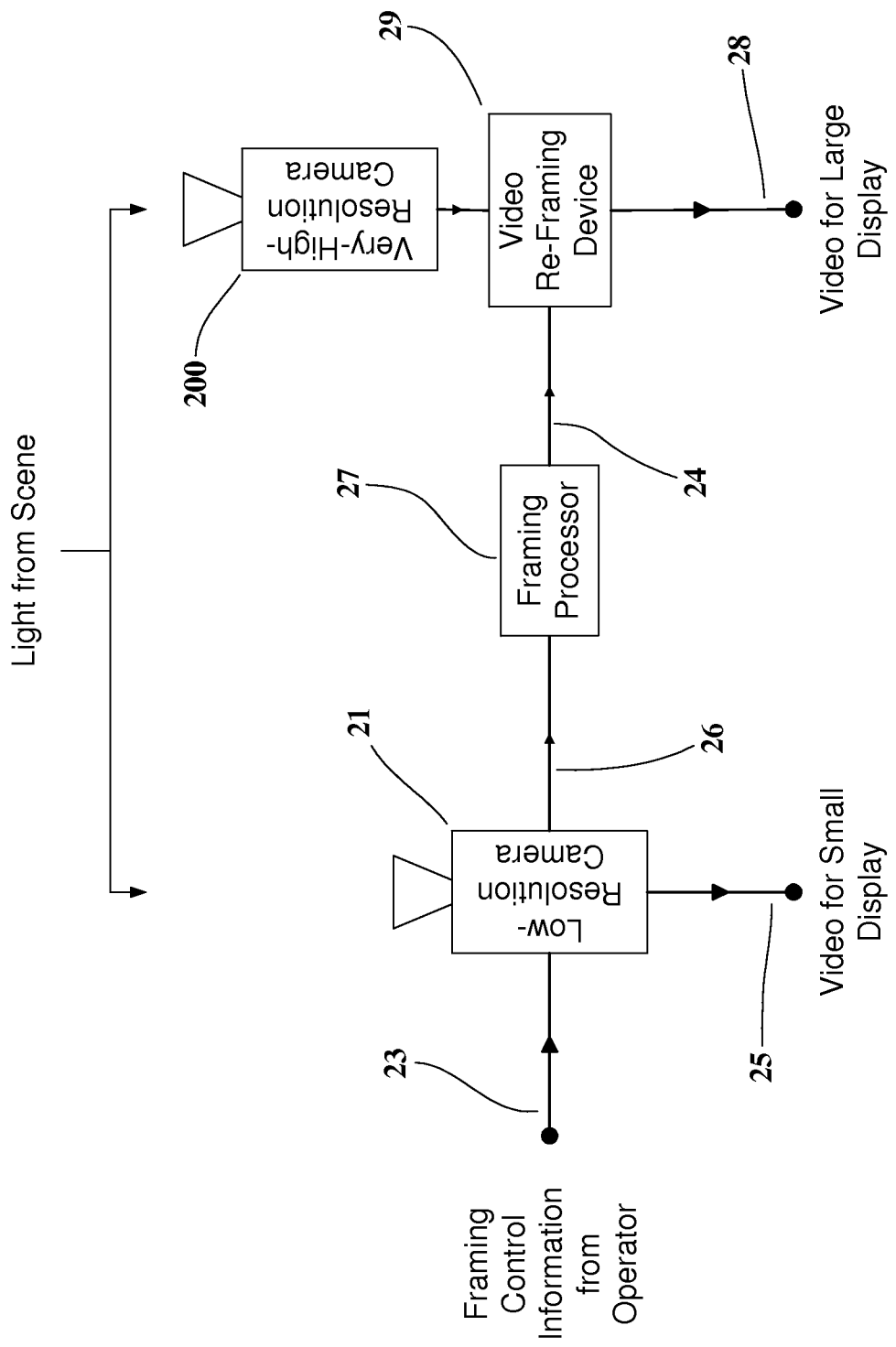
FIG. 2 shows an example of an image reframing system according to a second embodiment of the invention.

FIG. 2 shows an alternative embodiment of the invention to which reference is now directed. A low-resolution camera (21) provides a video output (25) intended for small-screen display. The framing of the low-resolution camera (21) is controlled by an operator who provides framing control information (23). The resulting framing of the low-resolution camera (21) is represented by framing data (26), which is processed in a framing processor (27) so as to obtain framing parameters (24) which are suitable for the control of a high-resolution camera.

The scene is also viewed by a wide-angle, very-high-resolution camera (200) which is "locked-off" and does not change its framing. The very-high-resolution video output from the very-high-resolution camera (200) is input to a video re-framing device (29), which also receives the framing parameters (24). The video re-framing device (29) selects part of the frame acquired by the very-high-resolution camera (200), in dependence on the framing parameters (24). The zoom parameter controls how much of the frame is selected, and the pan and tilt parameters control the position of the selected portion within the frame. This processing is achieved by any of the known techniques of digital video effects (DVE) including variable interpolation or decimation of samples from a video store whose read and or write addresses are modified according the framing parameters (24).

The portion of the frame selected by the re-framing device (29) is output as a video signal (28) intended for display on a high-resolution display device. The field of view of the very-high-resolution camera (200) must be sufficiently wide to include all parts of the scene which are potentially of interest; and, its resolution must be sufficiently high that, when part of its image is selected for display (by the re-framing device (29)), the resolution is adequate for large-screen display.

Figure 3:
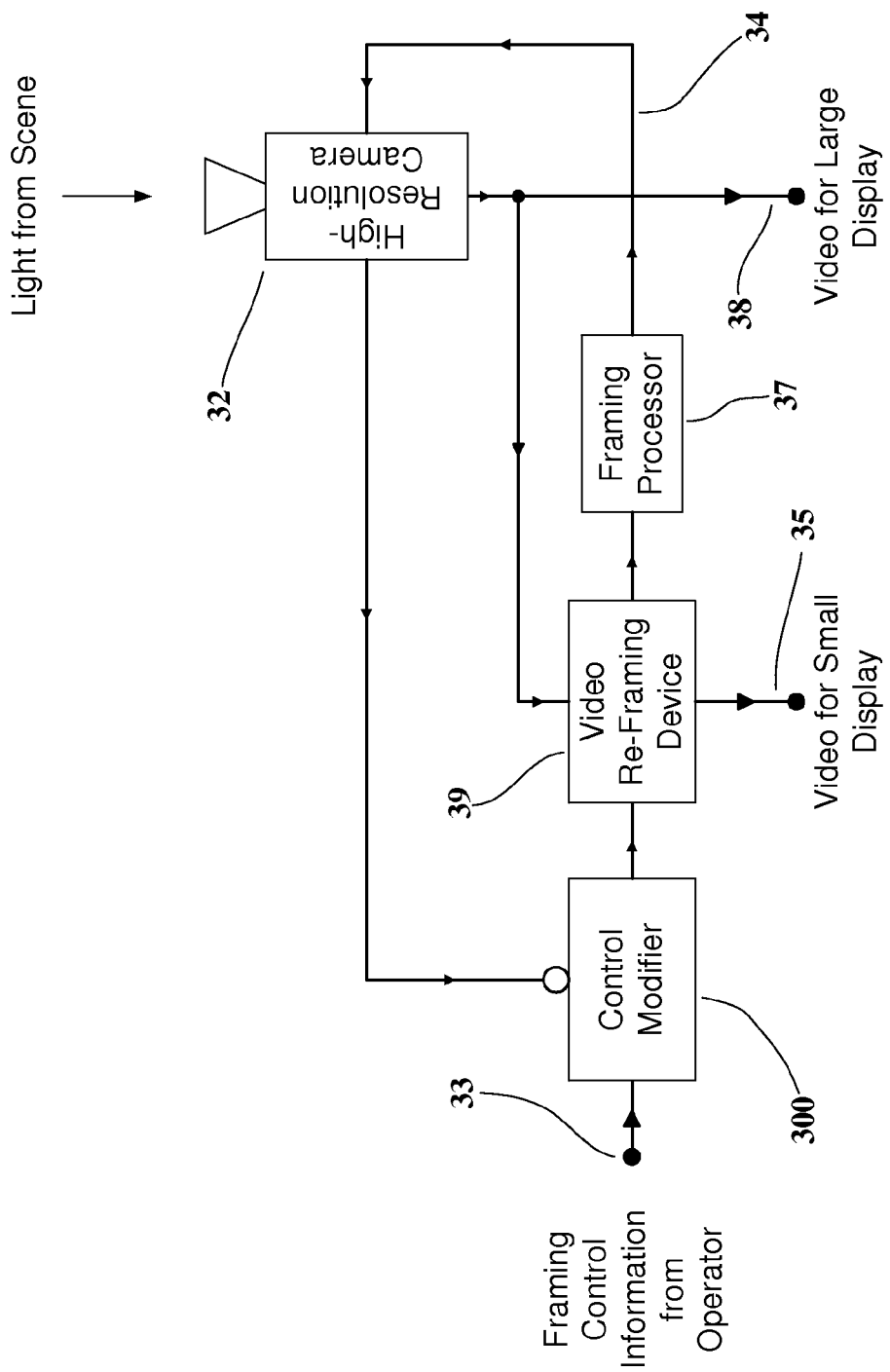
FIG. 3 shows an example of an image reframing system according to a third embodiment of the invention.

A further alternative arrangement is shown in FIG. 3, in which a single high-resolution camera (32) provides a video output (38) suitable for large-screen display. The framing of the high-resolution camera (32) is adjustable and is controlled by framing parameters (34), which are derived in a framing processor (37).

The high-resolution video output (38) is also input to a re-framing device (39), whose video output (35) is suitable for small-screen display. An operator views this video and provides framing-control information (33), which controls the video re-framing device (39) via the control modifier (300) (to be described below). The actual re-framing parameters applied by the video re-framing device (39) are processed by the framing processor (37) as described previously so as to control the framing of the high-resolution camera (32).

The actual framing parameters of the high-resolution camera (32) are fed back to the control modifier (300), which subtracts the actual camera framing parameters from the operator's framing control information (33). This negative feedback and subtraction ensures that the changes in the framing of the high-resolution camera (32), due to the framing parameters (34) from the framing processor (37), have no effect on the video (35). Any changes in the framing of this video will only be due to the operator's framing control information input (33).

In the systems of FIGS. 2 and 3 it has been assumed that the video re-framing device (29) or (39) can carry out all the re-framing operations that a camera operator might require. This will not always be the case; for example, changes in focus will be non-trivial to implement in the video domain because of the difficulty in establishing depth information. Also changes in perspective due to camera tracking will generally not be possible to replicate by processing a single video signal. It may therefore be necessary to limit the operation of the system to those re-framing actions which can be replicated in the video domain. Similarly, in the system of FIG. 1 there may be some framing parameters of the low-resolution camera (1) that the high-resolution camera (2) cannot implement; or, which may not be under control of the framing parameters (4); or, which are deliberately chosen to be fixed. For example, tilt or focus could be fixed if all relevant action is known to be visible without adjusting these parameters.

Although three different camera resolutions have been described in the above examples, any convenient resolution can be used with appropriate re-sampling where necessary. The video re-framing devices may also change the sampling structure of the video to make it more suitable for the intended display device or distribution channel.

It is possible to extend the techniques which have been described to the creation of more than one set of reframing parameters, intended for more than one camera having a wide field of view. If framing parameters are required for a field of view (derived from a camera or a video re-framing device) only slightly wider than the field of view controlled by the operator, then only slight modification of the operator's framing commands will be needed; i.e. the cut-off frequency of the temporal filter will be high, and only slight re-scaling and limiting of the framing data will be needed. If parameters for a significantly wider field of view are required, then a lower cut-off frequency and more severe re-scaling and limiting will be required.

It is therefore possible to derive differently-processed versions of the operator's framing commands to control the framing of differing fields of view. For example a cascaded chain of framing processors could derive sets of framing parameters for a range of fields of view intended for a range of display sizes.

In some applications, it will be useful to defer the video framing until a later stage in the distribution of the video. Thus the framing parameters output by the framing processor will accompany the high resolution camera output—typically as meta-data—to enable re-framing to take place subsequently, possibly after intervening processing of the high resolution camera output. Thus, with the example of the embodiment depicted in FIG. 3, the video framing device 39 may be used simply to provide a view for the operator. The video for large display would then be accompanied by an appropriately synchronised record of the framing parameters (or cascaded sets of framing parameters) to enable video to be generated subsequently for one or more small displays. A similar approach could be taken with the embodiment depicted in FIG. 2, if an appropriate transport pathway for the very high resolution camera output extends from the camera to the downstream reframing device.

As will be apparent to a skilled person, the present invention may be implemented in a variety of ways, and in particular may be implemented in hardware or in software.

The invention claimed is:

1. An apparatus for creating a plurality of moving video image sequences comprising first and second cameras adapted to provide respective overlapping fields of view of a scene; the first camera having a wider field of view and a higher resolution than the second camera, the second camera being adapted to be controlled by an operator;

a framing processor receiving framing parameters selected from the group consisting of pan parameters, tilt parameters, zoom parameters, track parameters and any combinations thereof, from said operator control and processing said parameters to derive processed framing parameters appropriate to the second camera; and a camera controller for applying processed framing parameters to the second camera.

2. The apparatus according to claim 1 in which at least one of the framing parameters is temporally filtered, re-scaled or limited in order to derive a framing parameter appropriate to the second camera.

3. A method of creating in a processor a plurality of moving video image sequences depicting a scene having respective overlapping fields of view, the plurality of image sequences comprising a first image sequence having a wider field of view and a higher resolution and a second image sequence having a narrower field of view and a lower resolution, the method comprising:

receiving from an operator framing control information for the second image sequence;

applying said operator framing control information to control the framing of the second image sequence;

deriving one or more framing parameters for the first image sequence automatically by processing in a framing processor data describing the framing of the second image sequence.

4. The method according to claim 3 in which the framing parameter or parameters are selected from the group consisting of a pan framing parameter; a tilt framing parameter; a zoom framing parameter and combinations thereof.

5. The method according to claim 4 in which the data describing the framing of the second image is temporally filtered in order to derive a framing parameter for the second image sequence.

6. The method according to claim 4 in which the data describing the framing of the second image sequence is re-scaled in order to derive a framing parameter for the second image sequence.

7. The method according claim 4 in which the data describing the framing of the second image sequence is limited in order to derive a framing parameter for the first image sequence.

8. A computer program product on non-transitory computer readable medium comprising instructions for implementing a method of creating a plurality of moving video image sequences depicting a scene having respective overlapping fields of view, the plurality of image sequences comprising a first image sequence having a wider field of view and a higher resolution and a second image sequence having a narrower field of view and a lower resolution, the method comprising:

receiving from an operator framing control information for the second image sequence;

applying said operator framing control information to control the framing of the second image sequence;

deriving one or more framing parameters for the first image sequence automatically by processing in a framing processor data describing the framing of the second image sequence.

9. A computer program product on a non-transitory computer readable medium according to claim 8 in which the framing parameter or parameters are selected from the group consisting of a pan framing parameter; a tilt framing parameter; a zoom framing parameter and combinations thereof.

10. A computer program product on non-transitory computer readable medium according to claim 9 in which the data describing the framing of the second image is temporally filtered in order to derive a framing parameter for the second image sequence.

11. A computer program product on non-transitory computer readable medium according to claim 9 in which the data describing the framing of the second image sequence is re-scaled in order to derive a framing parameter for the second image sequence.

12. A computer program product on non-transitory computer readable medium according claim 9 in which the data describing the framing of the second image sequence is limited in order to derive a framing parameter for the first image sequence.

* * * * *